(12) United States Patent
Ding et al.

(10) Patent No.: US 12,107,234 B2
(45) Date of Patent: Oct. 1, 2024

(54) LITHIUM ION BATTERY ELECTRODE ASSEMBLY

(71) Applicant: TESA SE, Norderstedt (DE)

(72) Inventors: Yuanlei Ding, Suzhou (CN); Haofeng Yang, Suzhou (CN)

(73) Assignee: TESA SE, Norderstedt (DE)

( * ) Notice: Subject to any disclaimer, the term of this patent is extended or adjusted under 35 U.S.C. 154(b) by 530 days.

(21) Appl. No.: 17/609,321

(22) PCT Filed: May 7, 2020

(86) PCT No.: PCT/EP2020/062792
§ 371 (c)(1),
(2) Date: Nov. 5, 2021

(87) PCT Pub. No.: WO2020/225393
PCT Pub. Date: Nov. 12, 2020

(65) Prior Publication Data
US 2022/0209304 A1 Jun. 30, 2022

(30) Foreign Application Priority Data
May 7, 2019 (CN) .................. 201910377338.1

(51) Int. Cl.
*H01M 10/0587* (2010.01)
*H01M 10/04* (2006.01)
(Continued)

(52) U.S. Cl.
CPC ... *H01M 10/0587* (2013.01); *H01M 10/0431* (2013.01); *H01M 10/0525* (2013.01); *H01M 50/107* (2021.01)

(58) Field of Classification Search
None
See application file for complete search history.

(56) References Cited

U.S. PATENT DOCUMENTS

2007/0154787 A1 7/2007 Jang et al.
2010/0255357 A1* 10/2010 Baek .................. H01M 10/052
429/94
2011/0287302 A1 11/2011 Kim et al.

FOREIGN PATENT DOCUMENTS

CN 203 218 345 U 9/2013
CN 105977507 A 9/2016
JP 2001052755 A 2/2001

OTHER PUBLICATIONS

International Search Report dated Aug. 10, 2020, issued in connection with PCT International Application No. PCT/EP2020/062792.
(Continued)

*Primary Examiner* — Wyatt P McConnell
(74) *Attorney, Agent, or Firm* — Norris McLaughlin, P.A.

(57) ABSTRACT

Lithium-ion battery electrode assemblies and methods are provided that comprise a winding structure, an immersion failure tape, and a can from the inside to the outside, wherein the winding structure is obtained by winding a layer structure. The layer structure comprises the following components from the inside to the outside: a1) a first separator layer; a2) a first electrode layer; a3) a second separator layer; a4) an expansion tape layer; and a5) a second electrode layer. The first and second electrode layers are different and are respectively selected from the group consisting of cathode layer and anode layer such that the electrode assemblies exhibit at least one of low impedance and good vibration resistance.

14 Claims, 4 Drawing Sheets

(51) Int. Cl.
*H01M 10/0525* (2010.01)
*H01M 50/107* (2021.01)

(56) References Cited

OTHER PUBLICATIONS

Written Opinion issued in connection with PCT International Application No. PCT/EP2020/062792.

* cited by examiner

LITHIUM ION BATTERY ELECTRODE ASSEMBLY

This application is a 371 of PCT/EP2020/062792, filed May 7, 2020, which claims foreign priority benefit under 35 U.S.C. § 119 of the Chinese Patent Application No. 201910377338.1, filed May 7, 2019, the disclosures of which are incorporated herein by reference.

TECHNICAL FIELD

The present invention relates to the field of batteries, and in particular to a lithium ion battery electrode assembly.

BACKGROUND ART

In recent years, new energy vehicles have developed rapidly under the support of the state. Lithium-ion batteries, as energy storage devices, have also seen a surge in demand. Cylindrical lithium-ion batteries have been widely used in digital products, power tools, electric vehicles and energy storage due to their high energy density, good consistency, uniform size and mature technology.

Compared with digital products, power tools and energy storage, electric vehicles put forward higher requirements for battery performance. First of all, the power requirements of the car during start-stop require the battery to output and input electric energy at high power. In order to ensure the rapid transfer of current between the electrode including the positive electrode and negative electrode and the outside and reduce the energy loss of the impedance, the number of positive tabs and negative tabs inside the battery will be more and more. The increase in the number of tabs greatly increases the difficulty of soldering the tabs to the bottom of the can, and it is difficult to ensure the strength of the solder joints. Secondly, the battery needs to be resistant to vibrations generated when the car is traveling on uneven road. However, in the assembly process of the battery, in order to facilitate the entry of the electrode assembly into the can, the diameter of the electrode assembly needs to be smaller than the inner diameter of the can. The difference between the diameter of the electrode assembly and the inner diameter of the can necessarily leads to the shaking of the electrode assembly within the can. During long-term use, the shaking of the electrode assembly will inevitably lead to the breakage of the positive tab and negative tab or the falling off of the solder joint.

SUMMARY OF THE INVENTION

The object of the present invention is to provide a novel lithium ion battery electrode assembly which has both low impedance and excellent vibration resistance and is very suitable for use in an electric vehicle.

In the first aspect of the present invention, a lithium ion battery electrode assembly is provided, the electrode assembly is cylindrical, and the electrode assembly comprises a winding structure, an immersion failure tape and a can from the inside to the outside, wherein the winding structure is obtained by winding a layer structure comprising the following components from the inside to the outside:
  a1) a first separator layer;
  a2) a first electrode layer;
  a3) a second separator layer;
  a4) an expansion tape layer;
  a5) a second electrode layer;

the first electrode layer and the second electrode layer are different and are respectively selected from the group consisting of cathode layer and anode layer.

In another preferred embodiment, the immersion failure tape comprises a first substrate layer and a first adhesive layer adhered to one side of the first substrate layer, the first adhesive layer is used to adhere the immersion failure tape onto the periphery of the winding structure.

In another preferred embodiment, the first substrate layer is formed of a material selected from the group consisting of nitrile butadiene rubber, OPS or a combination thereof;
the first adhesive layer is formed of a material selected from the group consisting of acrylic glue, rubber, silica gel or a combination thereof.

In another preferred embodiment, the length of the immersion failure tape is 30%-110%, 50%-100% or 70%-90% of the inner perimeter $\pi D_i$ of the electrode assembly.

In another preferred embodiment, the expansion tape layer comprises a second substrate layer and a second adhesive layer adhered to one side of the second substrate layer, the expansion tape layer is adhered to the end of the second electrode layer by the second adhesive layer along the winding direction.

In another preferred embodiment, the second substrate layer is formed of a material selected from the group consisting of TPU, polyisoprene, polybutadiene or a combination thereof;
the second adhesive layer is formed of a material selected from the group consisting of acrylic glue, rubber, silica gel or a combination thereof.

In another preferred embodiment, the length of the expansion tape is 30-100%, 40-95% or 50-90% of the inner perimeter $\pi D_i$ of the can.

In another preferred embodiment, the length of the first separator layer is 101-120%, 103-115% or 105-110% of the length of the first electrode layer.

In another preferred embodiment, the length of the second separator layer is 101-120%, 103-115% or 104-110% of the length of the second electrode layer.

In another preferred embodiment, the first electrode layer is cathode and the second electrode layer is anode.

In another preferred embodiment, the first electrode layer does not contain a tab.

In another preferred embodiment, the second electrode layer does not contain a tab.

In another preferred embodiment, the can is selected from the group consisting of a steel shell and an aluminum shell.

In another preferred embodiment, the inner diameter $D_i$ of the can is selected from the group consisting of 5-100 mm, 10-80 mm and 15-60 mm.

In another preferred embodiment, the wall thickness of the can is 100 to 500 μm, preferably 150 to 300 μm.

In another preferred embodiment, the height $H_{can}$ of the can is selected from the group consisting of 30-300 mm, 40-250 mm and 50-230 mm.

In another preferred embodiment, the thickness of the first substrate layer is selected from the group consisting of 5-80 um, 10-60 um and 15-40 um.

In another preferred embodiment, the width of the first substrate layer is the same as the width of the first adhesive layer and is selected from the group consisting of 5-30 mm, 8-20 mm and 10-15 mm.

In another preferred embodiment, the maximum outer diameter D1 of the product obtained after the immersion failure tape is bonded and wound around the winding structure is slightly less than or equal to the inner diameter $D_i$ of the can (e.g., $D1=D_i-150$ um or $D1=D_i-(150$ um$\pm 150$ um)).

In another preferred embodiment, the length of the first substrate layer is the same as the length of the first adhesive layer, and is 30%-110%, 50%-100% or 70%-90% of the perimeter $\pi D_i$ of the electrode assembly.

In another preferred embodiment, the thickness of the first adhesive layer is selected from the group consisting of 3-50 μm, 5-40 μm and 8-30 μm.

In another preferred embodiment, the immersion failure tape is bonded to the upper and lower ends of the periphery of the winding structure.

In another preferred embodiment, the farthest distance of the upper end of the immersion failure tape and the lower end of the immersion failure tape (i.e., from the upper edge of the immersion failure tape at the upper end to the lower edge of the immersion failure tape at the lower end) is 70-100%, 80-99%, 85-96% or 88-94% of the width of the second electrode layer.

In another preferred embodiment, the first electrode layer is cathode.

In another preferred embodiment, the thickness of the first electrode layer is selected from the group consisting of 40-200 um, 60-160 um and 90-150 um.

In another preferred embodiment, the length of the first electrode layer is selected from the group consisting of 100 mm-10 m, 500 mm-8 m and 800 mm-5 m.

In another preferred embodiment, the second electrode layer is anode. In another preferred embodiment, the thickness of the second electrode layer is selected from the group consisting of 40-200 um, 45-160 um and 90-150 um.

In another preferred embodiment, the length of the second electrode layer=the length of the first electrode layer+$n*\pi D_i$, wherein $n=0.5\sim 2$.

In the present invention, the width principle for the electrode layer is that the anode is 1.5 to 5 mm wider than the cathode, and the separator is 1.5 to 5 mm wider than the anode.

It should be understood that, in the present invention, the composition of the cathode material and that of the anode material are not particularly limited, and a cathode material and an anode material which are common in lithium ion batteries of the art may be used.

In another preferred embodiment, the material constituting the first separator layer is the same as or different from the material constituting the second separator layer, and is independently selected from the group consisting of PP, PP/PE/PP, PP/PE or its ceramic coated modified film.

In another preferred embodiment, the thickness of the first separator layer is the same as or different from the thickness of the second separator layer, and is independently selected from the group consisting of 5-40 um, 7-30 um and 10-25 um.

In another preferred embodiment, the length of the first separator layer is 101-120%, 103-115% or 104-110% of the length of the first electrode layer.

In another preferred embodiment, the length of the second separator layer is 101-120%, 103-115% or 104-110% of the length of the second electrode layer.

In another preferred embodiment, the width of the first separator layer is the same as the width of the second separator layer, and is the width of anode layer+(1.5 to 5 mm).

In another preferred embodiment, the length of the second substrate layer is the same as that of the second adhesive layer, and is 30-100%, 40-95% or 50-90% of the inner perimeter $\pi D_i$ of the electrode assembly.

In another preferred embodiment, the width of the second substrate layer is the same as that of the second adhesive layer and is the width of the second electrode layer.

In another preferred embodiment, the thickness of the second substrate layer is selected from the group consisting of 10-150 um, 20-100 um and 30-80 um.

In another preferred embodiment, the second adhesive layer has a thickness selected from the group consisting of 5-50 um, 7-40 um and 9-20 um.

It should be understood that in the present invention, any of the technical features specifically described above and below (such as in the Examples) can be combined with each other, which will not redundantly be described one by one herein.

DETAILED DESCRIPTION OF UTILITY MODEL

Through extensive and intensive long research, the present inventors obtained a lithium ion battery electrode assembly having low impedance and good vibration resistance by providing an immersion failure tape on the periphery of the winding structure and an expansion tape between the terminal of the outer electrode of the battery electrode assembly and the separator. On this basis, the inventors have completed the present invention.

Lithium Ion Battery Electrode Assembly

The invention provides a new type of lithium ion battery electrode assembly, wherein a new type of tape which will fail after the immersion of the electrolyte solution (i.e. immersion failure tape) is used in combination with the expansion tape.

Figure 1:
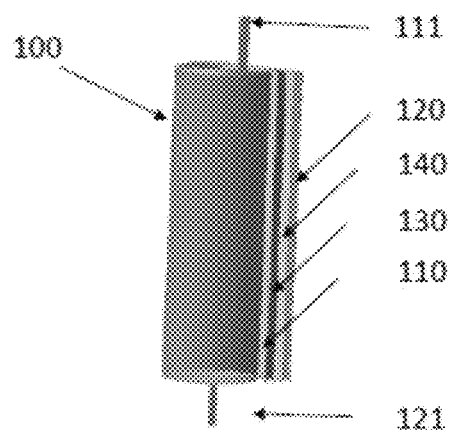
FIG. 1 is a structural schematic view of a conventional battery electrode assembly.
Figure 2:
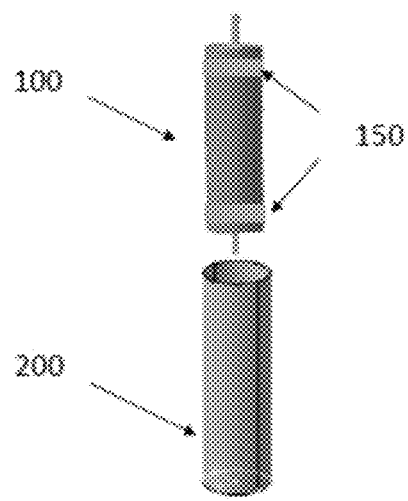
FIG. 2 is an assembly structural schematic view of a conventional battery electrode assembly and a can.

As shown in FIGS. 1 and 2, the conventional battery electrode assembly 100 is composed of a positive electrode 110, a negative electrode 120, a separator 130/140 and a termination tape 150. The positive electrode 110 and the negative electrode 120 have a positive electrode tab 111 and a negative electrode tab 121, and the tabs are respectively in contact with the cap and the can by welding.

The immersion failure tape is used as the termination tape 150 in the lithium ion battery electrode assembly 100, and the immersion failure tape is used to maintain the winding state of the battery electrode assembly after winding and before assembling into the can and before injecting electrolyte into the battery, and it will no longer have bonding and tensile strength after being immersed by the electrolyte, and the diameter of the battery electrode assembly will no longer be bound by the tape.

Specifically, the substrate of the immersion failure tape is mainly made of nitrile rubber, OPS (Oriented Polystyrene) etc., and is coated with acrylic or silica gel as a binding component. Nitrile rubber and OPS are low-polymerized small molecular substances, which have a certain mechanical strength under normal conditions to ensure the constraint on the electrode assembly. The substance can be softened or dissolved quickly after being immersed in the electrolyte, thereby releasing the binding of the electrode assembly and facilitating the expansion of the expansion tape, so that the electrode is in close contact with the can.

Figure 3:
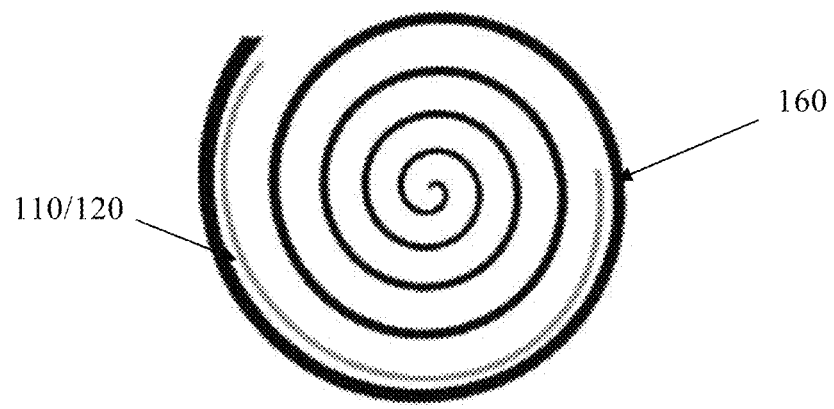
FIG. 3 is a partial structural schematic view of the battery electrode assembly of the present invention.

As the termination tape, the expansion tape is used more and more in the lithium ion battery. Its purpose is to expand after being immersed in the electrolyte, thus reducing the gap between the electrode assembly 100 and the can 200 and improving the vibration resistance of the battery. In the novel lithium ion battery electrode assembly, the electrode assembly is terminated by the positive electrode 110 or the negative electrode 120 (the positive electrode and the negative electrode are terminated as follows: if the outer can of the cylindrical battery is a steel shell, the battery electrode assembly will be terminated by a negative electrode; if it is an aluminum shell, the electrode assembly will be terminated by a positive electrode) to ensure that the electrode and the can could be in direct contact. The expansion tape 160 is attached to the inner side of the electrode (positive electrode or negative electrode) which is in contact with the can (see FIG. 3), and its use length depends on the design of the cell and the expansion ratio of the tape, and its length is generally ⅕~⅘ of the perimeter of the electrode located at the outermost side (D is the diameter of the electrode assembly); its width is the same as the width of the electrode. During actual production, the bonding process of the expansion tape and the electrode can be designed between the rolling and slitting processes.

Specifically, the substrate of the expansion tape is mainly made of TPU (thermoplastic polyurethane), polyisoprene, polybutadiene expanded material etc., and is coated with glue such as acrylic or silica gel as a bonding material. The special characteristic of the substrate is that it can be rapidly expanded after being wetted by the lithium battery electrolyte, and the expansion volume does not decrease in the later stage, and the expansion ratio of the substrate is more than 300% to ensure effective extrusion to the electrode.

Figure 4:
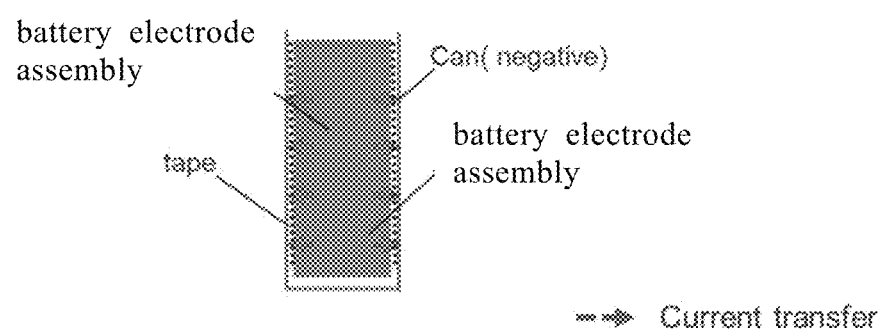
FIG. 4 is a schematic diagram of current transfer of the battery electrode assembly of the present invention.

After the electrolyte is injected into the battery, the mechanical properties of the immersion failure tape are disabled to release the binding to the electrode assembly, and the expansion tape is expanded to squeeze the electrode. As a result of the combination use of two types of tape, the electrode to which the expansion tape is attached is pressed into close contact with the can. Its significance lies in: 1. it reduces the gap between the electrode assembly and the can and has better anti-vibration effect; 2. as shown in FIG. 4, the electrode is in close contact with the can, which is conducive to the transmission of current, greatly reduces the impedance of the battery, improves the high power output capability of the battery, or reduces the number of tabs on the electrode, or even can cancel the design of this tab. 3. if the tabs on the electrode are removed, the following advantages will be brought: a, reducing the blank position on the electrode, which can simplify the coating process and increase the energy density of the cell; b, the tab and its protective tape can be omitted, and the production process thereof can be canceled, which can save material and reduce process cost; c, eliminate bottom welding, simplify the assembly process, and avoid damage to the outer can and formation of welding slag during bottom welding; d, the heat produced when current flows can be quickly dissipated on the side of the battery, avoiding heat accumulation at the bottom.

It should be understood that, in the present invention, the longitudinal direction is the electrode assembly winding direction, and the width direction is the electrode assembly axial direction.

In the present invention, the cylindrical battery is mainly 18650 (diameter 18 mm, height 65 mm), 21700 (diameter 21 mm, height 70 mm) and 26650 (diameter 26 mm, height 65 mm). However, the present invention can be applied to cylindrical batteries of a non-standard size such as 63225 (diameter 63 mm, height 225 mm), 43176 (diameter 43 mm, height 176 mm), 38120 (diameter 38 mm, height 120 mm).

In the present invention, the expansion tape is adhered only to the outermost portion of the electrode, and the length is up to 3.14*(the battery diameter); and the length of the electrode and that of the separator is equivalent to several hundred millimeters to several meters.

The present invention will be further illustrated below with reference to the specific examples. It should be understood that these examples are only to illustrate the invention but not to limit the scope of the invention. The experimental methods with no specific conditions described in the following examples are generally performed under the conventional conditions, or according to the manufacturer's instructions. Unless indicated otherwise, parts and percentage are calculated by weight.

Unless otherwise defined, all professional and scientific terminology used in the text have the same meanings as known to the skilled in the art. In addition, any methods and materials similar or equal with the record content can apply to the methods of the invention. The method of the preferred embodiment described herein and the material are only for demonstration purposes.

Example 1 Battery Electrode Assembly 1

Figure 5:
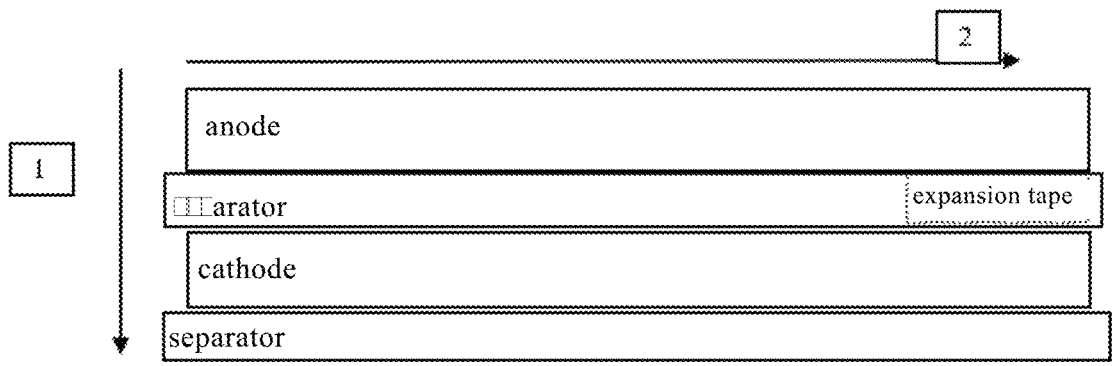
FIG. 5 is a structural schematic view of the winding structure before winding in example 1 of the present invention, wherein the arrow direction 1 is from the outside to the inside, and the arrow direction 2 is the winding direction.

The cylindrical battery electrode assembly 1 has the following layer structure from the inside to the outside:
separator 1: PP/PE composite film with ceramic coating, length 1050 mm, width 60 mm, thickness 20 um;
cathode, including aluminum foil (length 1000 mm, width 56 mm, thickness 10 um) and cathode material coated on its surface (positive active material is $LiCoO_2$, conductive agent is carbon black, binder is PVDF, the amount ratio of the three is 93:6:1, the thickness of the single-sided coating is 60 um, the thickness of the coating on both sides of the aluminum foil is the same, and the cathode contains the cathode tab;
separator 1': PP/PE composite film with ceramic coating, length 1080 mm, width 60 mm, thickness 20 um;
expansion tape 1: length 50 mm, width 58 mm, thickness 60 um, attached to the anode and located between separator 1' and the anode, including the substrate adjacent to the separator (TPU (thermoplastic polyurethane elastomer rubber), length 50 mm, width 58 mm, thickness 50 um) and adhesive layer 1 (acrylic glue, length 50 mm, width 58 mm, thickness 10 um) attached to the substrate and the anode, the expansion tape 1 is located at the end of the anode along the winding direction; anode, including copper foil (length 1060 mm, width 58 mm, thickness 8 um) and anode material coated on its surface (the anode active material is graphite, the conductive agent is carbon black, the binder is CMC/SBR, the amount ratio of the three is 96:3.5:0.5, the thickness of the single-sided coating is 61 um, the thickness of the coating on both sides of the copper foil is the same, and the anode material is adjacent to the adhesive layer 1, the anode does not contain anode tab;

winding the above structure (as shown in FIG. 5), binding immersion failure tape 1 (the substrate material is OPS and the adhesive layer material is rubber, for the substrate, length 50 mm, width 10 mm, thickness 30 um; for the adhesive layer, length 50 mm, width 10 mm, thickness 15 um) around the upper and lower ends of the winding structure obtained above (the farthest distance between the immersion failure tape at upper end and the immersion failure tape at lower end is 50 mm);

next, the obtained structure was placed into a package can having a height of 65 mm, an inner diameter of 18 mm and an outer diameter of 18.3 mm (a steel can) to obtain a battery electrode assembly 1.

Example 2 Battery Electrode Assembly 2

The difference from example 1 is that the anode adopts a tab design.

Example 3 Battery Electrode Assembly 3

Figure 6:
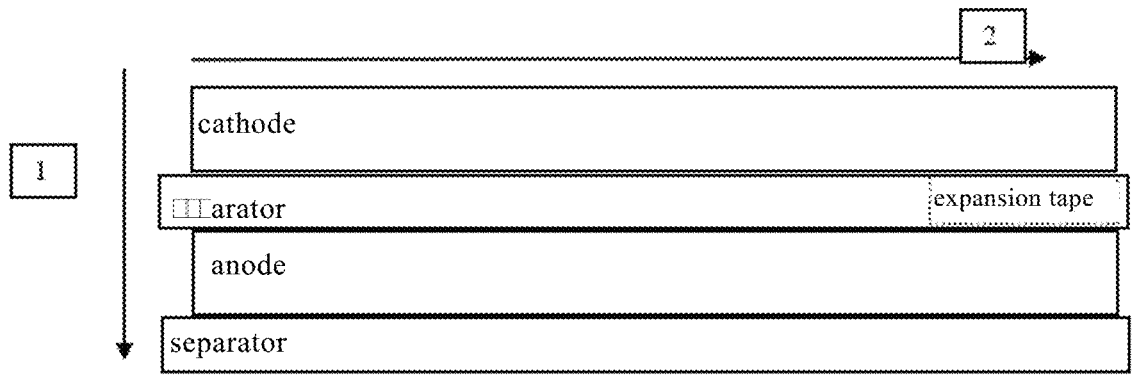
FIG. 6 is a structural schematic view of the winding structure before winding in example 3 of the present invention, wherein the arrow direction 1 is from the outside to the inside, and the arrow direction 2 is the winding direction.

The cylindrical battery electrode assembly 3 has the following layer structure from the inside to the outside:

separator 3: PE/PP composite separator, length 1550 mm, width 67 mm, thickness 18 um, separator 3 is adjacent to the anode material;

anode, including copper foil (length 1500 mm, width 65 mm, thickness 6 um) and anode material coated on its surface (the anode active material is graphite, the conductive agent is Super P, the binder is CMC/SBR, the amount ratio of the three is 95:4:1, the thickness of the single-sided coating is 60 um, the thickness of the coating on both sides of the copper foil is the same), and the anode contains the anode tab;

separator 3': PE/PP composite separator, length 1580 mm, width 67 mm, thickness 18 um, separator 3' is adjacent to the anode material;

expansion tape 3: length 60 mm, width 63 mm, thickness 80 um, attached to the cathode and located between separator 3' and cathode, including the substrate adjacent to the separator (TPU, length 60 mm, width 63 mm, thickness 70 um) and adhesive layer 3 (rubber, length 60 mm, width 63 mm, thickness 10 um) attached to the substrate and the cathode, the expansion tape 3 is located at the end of the cathode along the winding direction;

cathode, including aluminum foil (length 1560 mm, width 63 mm, thickness 12 um) and positive electrode material coated on its surface (positive electrode active material is NMC, conductive agent is conductive carbon black, binder is PVDF, the amount ratio of the three is 93:6:1, the thickness of the single-sided coating is 58 um, the thickness of the coating on both sides of the aluminum foil is the same), the positive electrode material is adjacent to the adhesive layer 3, and the cathode does not contain the cathode tab;

winding the above structure (as shown in FIG. 6), binding immersion failure tape 3 (the substrate material is OPS and the adhesive layer material is rubber, for the substrate, length 56 mm, width 10 mm, thickness 30 um; for the adhesive layer, length 56 mm, width 10 mm, thickness 15 um) around the upper and lower ends of the winding structure obtained above (the farthest distance between the immersion failure tape at upper end and the immersion failure tape at lower end is 53 mm);

next, the obtained structure was placed into a package can having a height of 70 mm, an inner diameter of 21 mm and an outer diameter of 21.4 mm (a aluminum can) to obtain a battery electrode assembly 3.

Example 4 Battery Electrode Assembly 4

The difference from example 3 is that the cathode adopts the tab design.

Comparative Example 1 Electrode Assembly C1

The difference from example 1 is that the expansion tape 1 is not used.

Comparative Example 2 Electrode Assembly C2

The difference from example 3 is that the expansion tape 3 is not used.

Performance Test

Perform the impedance and vibration tests on the battery electrode assembly 1 and C1 respectively:

Impedance test:

After the battery was formed, 256 batteries were taken for comparison test. Charge the battery to 30% SOC, after standing for 1 h, test the AC impedance of the battery with HIOKI BT4560, test frequency 1 KHz.

Figure 7:
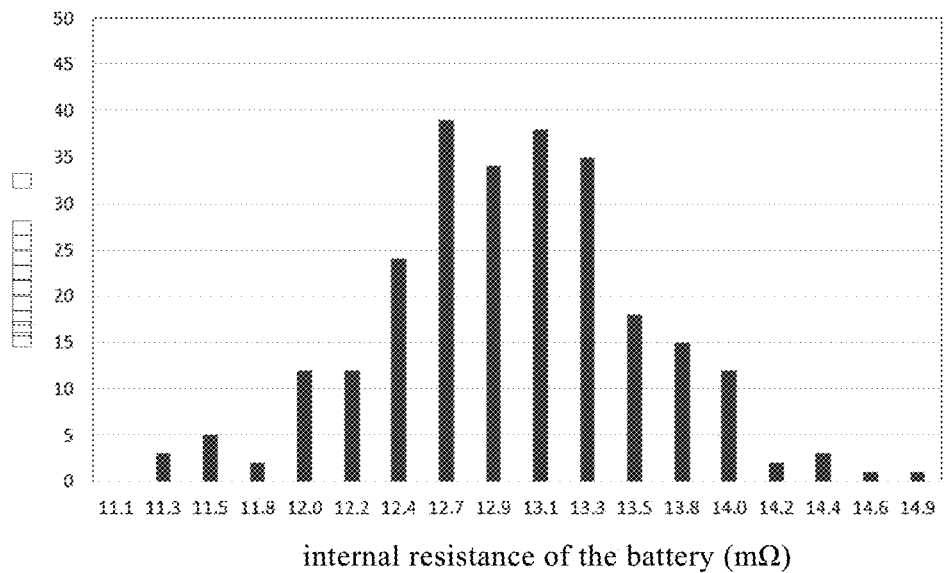
FIG. 7 shows the impedance normal distribution of the battery obtained from the electrode assembly 1 in Example 1.
Figure 8:
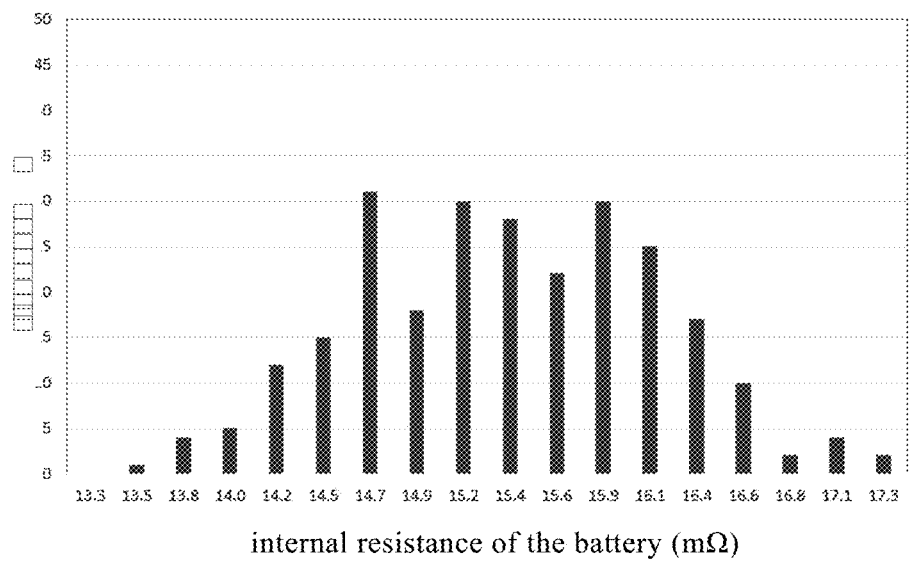
FIG. 8 shows the impedance normal distribution of the battery obtained from the electrode group C1 in Comparative Example 1.

As can be seen from FIGS. 7 and 8, the electrode assembly of the present invention not only reduces the impedance of the battery (the impedance mean decreases from 15.2 to 12.9), but also the battery's impedance distribution is more concentrated, and the battery is more consistent.

Vibration Test:

32 formed batteries were subjected to comparative test for vibration resistance.

Refer to GB/T 31467.3-2015 test standard, Dongling ES-6-230 was used to test the vibration of the battery.

It has been found through testing that batteries using expansion tape can all pass the vibration test. As to the batteries that do not use the expansion tape, although they can pass the vibration test, the design is more demanding on the winding process. In order to further verify the effect of the expansion tape, we used a method of multiple vibration tests to compare Example 1 with Comparative Example 1. After three vibration tests, the battery damage rate of the battery using the expansion tape was 12.5% (four batteries failed), while the battery damage rate of the battery without the expansion tape was 21.8% (seven batteries failed).

All literatures mentioned in the present invention are incorporated by reference herein, as though individually incorporated by reference. Additionally, it should be understood that after reading the above teaching, many variations and modifications may be made by the skilled in the art, and these equivalents also fall within the scope as defined by the appended claims.

The invention claimed is:

1. A lithium ion battery electrode assembly comprising:
a winding structure;
an immersion failure tape; and
a can from the inside to the outside,
wherein
the lithium ion battery electrode is cylindrical,
the winding structure is obtainable by winding a layer structure comprising the following components from the inside to the outside:
a1) a first separator layer;
a2) a first electrode layer;
a3) a second separator layer;
a4) an expansion tape layer; and
a5) a second electrode layer; and
the first electrode layer and the second electrode layer are different and are respectively selected from the group consisting of cathode layer and anode layer.

2. The lithium ion battery electrode assembly according to claim 1, wherein
the immersion failure tape comprises a first substrate layer and a first adhesive layer adhered to one side of the first substrate layer, and
the first adhesive layer is used to adhere the immersion failure tape onto the periphery of the winding structure.

3. The lithium ion battery electrode assembly according to claim 2, wherein
the first substrate layer is formed of at least one material selected from the group consisting of nitrile butadiene rubber, OPS and combination thereof, and
the first adhesive layer is formed of at least one material selected from the group consisting of acrylic glue, rubber, silica gel and combination thereof.

4. The lithium ion battery electrode assembly according to claim 1, wherein a length of the immersion failure tape is 30%-110% of an inner perimeter TTDi of the lithium ion battery electrode assembly.

5. The lithium ion battery electrode assembly according to claim 1, wherein
the expansion tape layer comprises a second substrate layer and a second adhesive layer adhered to one side of the second substrate layer, and
the expansion tape layer is adhered to the end of the second electrode layer by the second adhesive layer along a winding direction.

6. The lithium ion battery electrode assembly according to claim 5, wherein
the second substrate layer is formed of at least one material selected from the group consisting of TPU, polyisoprene, polybutadiene and combination thereof, and
the second adhesive layer is formed of at least one material selected from the group consisting of acrylic glue, rubber, silica gel and combination thereof.

7. The lithium ion battery electrode assembly according to claim 1, wherein a length of the expansion tape is 30-100% of an inner perimeter TTDi of the can.

8. The lithium ion battery electrode assembly according to claim 1, wherein a length of the first separator layer is 101-120% of a length of the first electrode layer.

9. The lithium ion battery electrode assembly according to claim 1, wherein a length of the second separator layer is 101-120% of a length of the second electrode layer.

10. The lithium ion battery electrode assembly according to claim 1, wherein the first electrode layer is a cathode, and the second electrode layer is an anode.

11. The lithium ion battery electrode assembly according to claim 4, wherein the length of the immersion failure tape is 70%-90% of the inner perimeter TTDi of the electrode assembly.

12. The lithium ion battery electrode assembly according to claim 7, wherein the length of the expansion tape is 50-90% of the inner perimeter TTDi of the can.

13. The lithium ion battery electrode assembly according to claim 8, wherein the length of the first separator layer is 105-110% of the length of the first electrode layer.

14. The lithium ion battery electrode assembly according to claim 9, wherein the length of the second separator layer is 104-110% of the length of the second electrode layer.

* * * * *